United States Patent [19]

Sasaki et al.

[11] Patent Number: 5,007,698
[45] Date of Patent: Apr. 16, 1991

[54] OPTICAL FIBER AMPLIFIER/MULTIPLEXER

[75] Inventors: Kazuya Sasaki, Mitaka; Sakae Yoshizawa, Tokyo; Shinya Inagaki, Tokyo; Keiko Takeda, Yokohama, all of Japan

[73] Assignee: Fujitsu Limited, Kawasaki, Japan

[21] Appl. No.: 567,614

[22] Filed: Aug. 15, 1990

[30] Foreign Application Priority Data

Aug. 15, 1989 [JP] Japan ................... 1-209700

[51] Int. Cl.$^5$ .......................... G02B 6/26; H01S 3/30; H04J 1/00
[52] U.S. Cl. .................. 350/96.15; 350/96.12; 350/96.16; 350/96.29; 350/96.34; 372/6; 370/1; 370/3
[58] Field of Search ............... 350/96.15, 96.11, 96.12, 350/96.17, 96.16, 96.20, 96.29, 96.30, 96.34; 372/6, 68, 70, 108; 370/1, 3; 455/601, 610

[56] References Cited

U.S. PATENT DOCUMENTS

| | | | |
|---|---|---|---|
| 4,515,431 | 5/1985 | Shaw et al. | 350/96.15 |
| 4,546,476 | 10/1985 | Shaw et al. | 372/6 |
| 4,553,238 | 11/1985 | Shaw et al. | 372/6 |
| 4,742,307 | 5/1988 | Thylen | 372/6 X |
| 4,782,491 | 11/1988 | Snitzer | 372/6 |
| 4,805,977 | 2/1989 | Tamura et al. | 350/96.16 |
| 4,820,010 | 4/1989 | Scifres et al. | 350/96.15 |
| 4,852,117 | 7/1989 | Po | 372/6 X |
| 4,867,518 | 9/1989 | Stamnitz et al. | 350/96.15 |
| 4,938,561 | 7/1990 | Grasso et al. | 372/6 X |
| 4,941,726 | 7/1990 | Russell et al. | 372/6 X |

FOREIGN PATENT DOCUMENTS

| | | | |
|---|---|---|---|
| 0346951 | 12/1989 | European Pat. Off. | 372/6 X |
| 2844129 | 4/1980 | Fed. Rep. of Germany | 372/6 X |

Primary Examiner—Brian Healy
Attorney, Agent, or Firm—Staas and Halsey

[57] ABSTRACT

An optical waveguide having a first cross section is thinned to constitute a thinned portion having a second cross section, as long as a predetermined length. Surface of the thinned portion is contacted with a laser glass member doped with a rare earth element, such as Er. Due to the thinned diameter, the optical fiber is optically coupled with the laser glass member. A pumping light is input to either into the optical waveguide together with a signal light or directly into the laser glass member. Signal light coupled from the thinned portion to the laser glass member is amplified by stimulated emission of the laser glass. Thus amplified signal light is coupled back to the thinned portion so as to propagate along the optical waveguide. The thinned portion can be as short as several centi-meters compared with ten meters to more than one hundred meters of conventional optical amplifier. In the optical waveguide where the pumping light is directly input to the laser glass member, the complicated multiplexer is not necessary, resulting in a reliable operation of the amplifier.

24 Claims, 4 Drawing Sheets

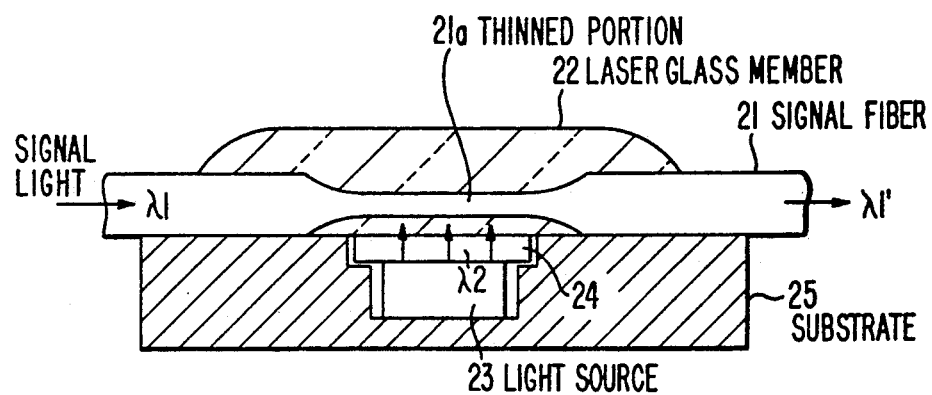
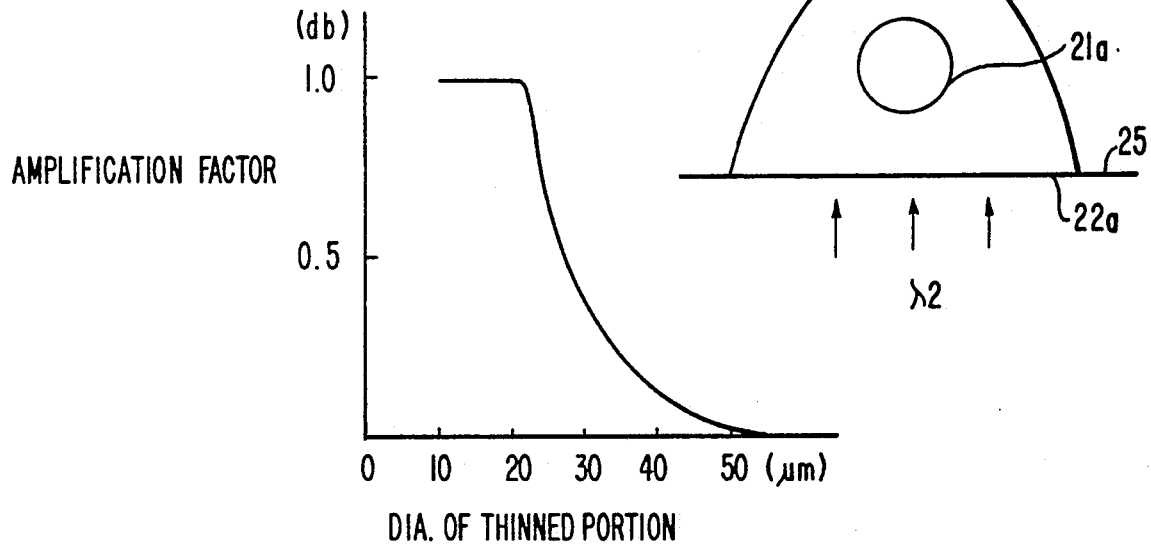
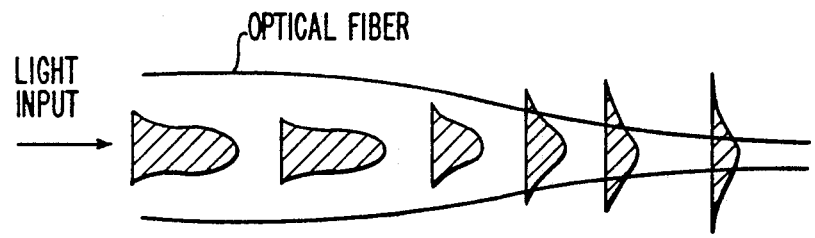

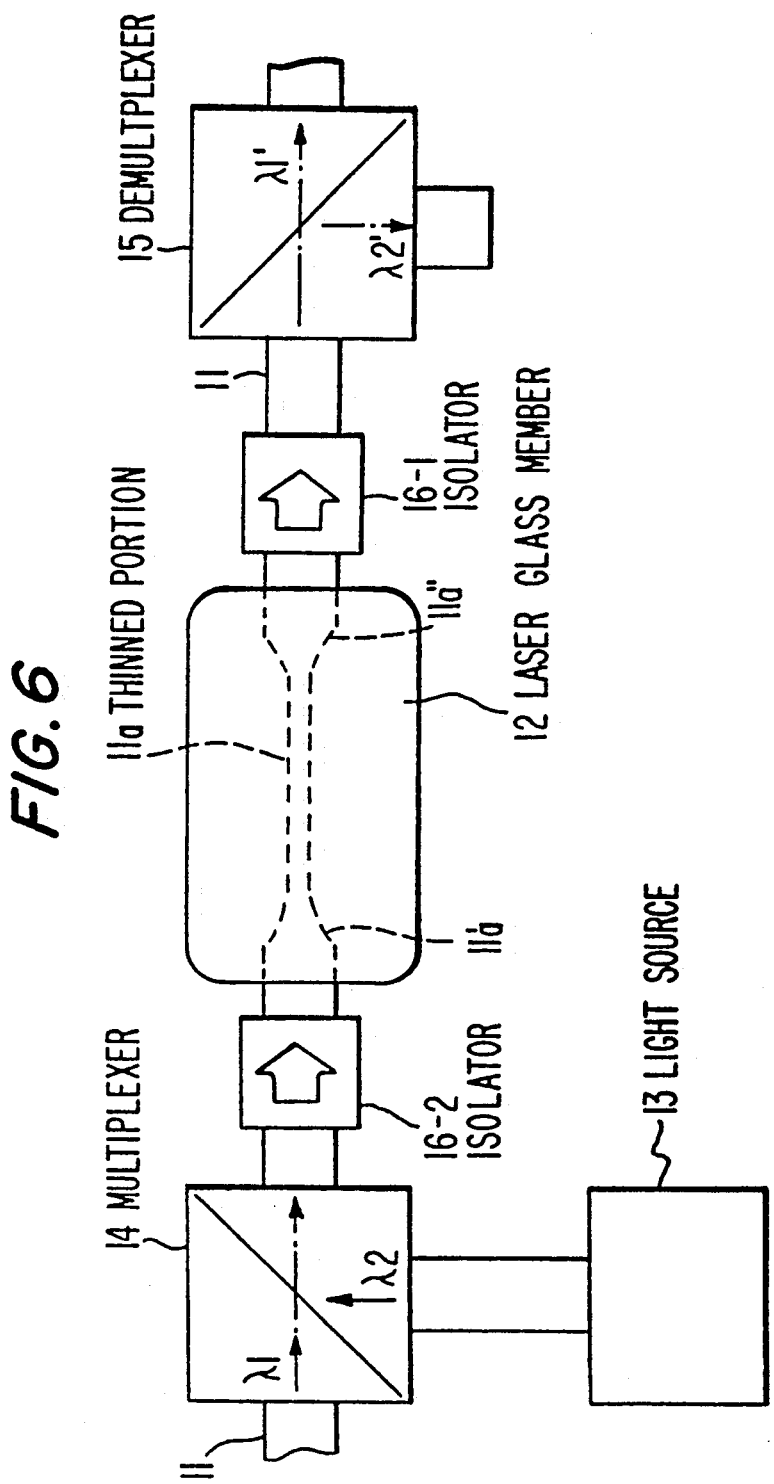

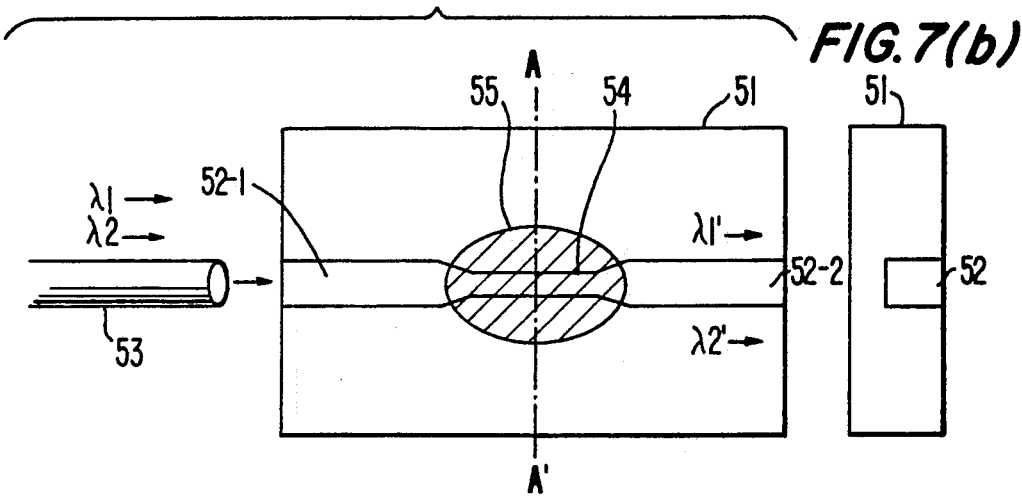
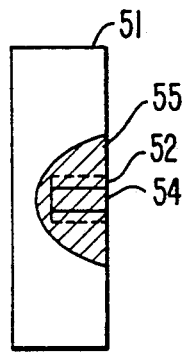
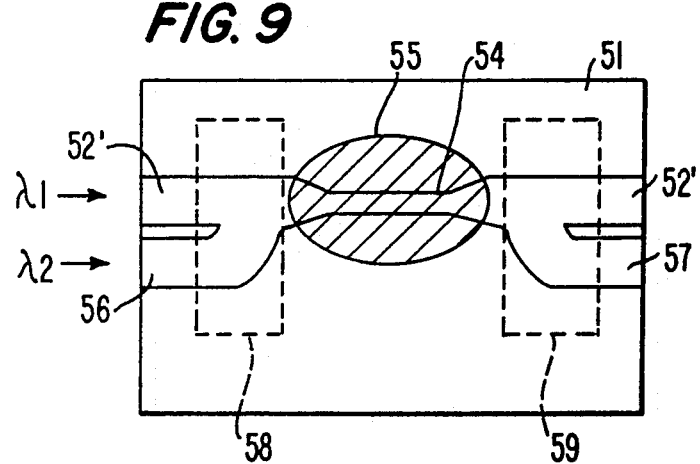
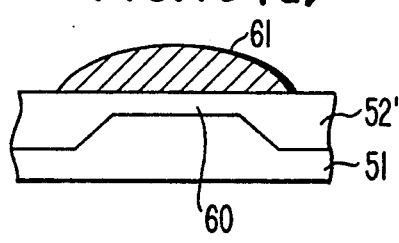
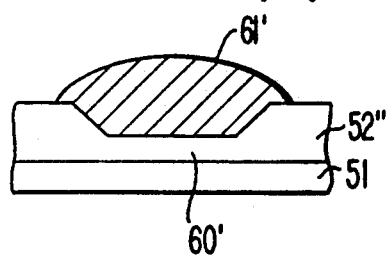

OPTICAL FIBER AMPLIFIER/MULTIPLEXER

BACKGROUND OF THE INVENTION

1. Field of the Invention

This invention relates to an optical amplifier which amplifies a signal light propagating in an optical waveguide by means of laser glass doped with a rare earth.

2. Description of the Related Art

A prior art optical amplifier employing a glass fiber doped with a rare earths is constituted as typically shown in FIG. 1. In the figure, the numeral 40 denotes an amplifier substrate; the numerals 41 and 42 denote an optical fiber for signal light transmission; the numeral 43 denotes an optical fiber doped with a rare earth element; the numeral 44 denotes a light source typically formed with a laser, for emitting a pumping light; the numeral 45 denotes a multiplexer; and the numeral 46 denotes a demultiplexer. A signal light of 1.536 $\mu$m wavelength incident to optical fiber 41 is input to optical fiber 43 doped with Er (erbium). A pumping light of, for example, 1.49 $\mu$m or 0.98 $\mu$m wavelength is introduced by multiplexer 45 so as to transmit into optical fiber 43 together with the signal light. During the transmission in optical fiber 43 doped with rare earth, electrons in the rare earth element are pumped up by the pumping light so as to amplify the signal light due to a stimulated emission effect. The amplified light is transmitted via demultiplexer 46 into optical amplifier 42. Pumping light which is unnecessary now is removed by demultiplexer 46 so as to be abandoned. Direction of the pumping light propagation in the rare-earth-doped optical fiber 43 may be chosen opposite, i.e. backward, to the signal light propagation. Moreover, demultiplexer 46 may be replaced with an isolator of the pumping light.

The above-described prior art optical amplifier employing the optical fiber doped with the rare earth requires relatively large number of components and requires as long as several meters or more than one hundred meters of the rare-earth doped optical fiber 43. Moreover, the multiplexer requires its precise alignment; therefore, it has been difficult to satisfy the requirements for compactness as well as high reliability for the use in, for example, a submarine cable system.

SUMMARY OF THE INVENTION

It is a general object of the invention to provide a compact optical amplifier.

It is another object of the invention to provide a reliable optical amplifier requiring no complicated components nor complicated alignment work thereof.

An optical waveguide having a first diameter is thinned to constitute a thinned portion having a second diameter. External surface of the amplifier portion is coated with a laser glass member. Due to the thinned diameter, the optical fiber is optically coupled with the laser glass member. A pumping light is input to either into the optical fiber together with a signal light or directly into the laser glass member. Signal light leaking into the laser glass member is amplified by the pumping light in the laser glass member. Thus amplified signal light is coupled back to the thinned portion so as to propagated along the optical fiber. The thinned portion can be as short as several centi-meters compared with several tens of meters of conventional optical amplifier.

The above-mentioned features and advantages of the present invention, together with other objects and advantages, which will become apparent, will be more fully described hereinafter, with reference being made to the accompanying drawings which form a part hereof, wherein like numerals refer to like parts throughout.

BRIEF DESCRIPTION OF THE DRAWINGS

FIG. 3(a) shows a cross-sectional side view cut along axis of thinned portion of a second preferred embodiment of the present invention;

FIG. 3(b) shows a cross-sectional view cut orthogonal to axis of the FIG. 3(a) preferred embodiment;

FIG. 4 schematically illustrates radial distribution of light power changing along a gradually thinned optical fiber;

FIG. 5 shows amplification gain of the first preferred embodiment versus diameter of the thinned portion of the optical fiber;

FIG. 6 schematically illustrates a third preferred embodiment of the present invention;

FIGS. 7(a) and 7(b) schematically illustrate a fourth preferred embodiment of the present invention;

FIG. 8 schematically illustrate a cross-sectional view of the thinned portion of FIG. 8 preferred embodiment;

FIG. 9 schematically illustrated a fifth preferred embodiment of the present invention; and FIGS. 10(a) and 10(b) schematically illustrate longitudinal cross-sectional views of thinned portions of sixth preferred embodiments of the present invention.

DESCRIPTION OF THE PREFERRED EMBODIMENTS

Figure 1:
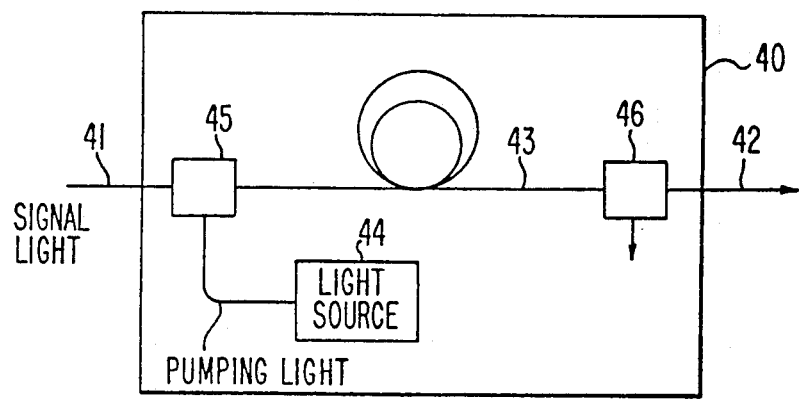
FIG. 1 schematically illustrates a prior art optical amplifier.

Referring to drawings, preferred embodiments of the present invention are hereinafter described in detail. FIGS. 2 show a first preferred embodiment of the present invention. An optical fiber 11 for transmitting a signal light $\lambda_1$ (referred to hereinafter as a signal fiber) is formed of quartz consisting of a core 1a and a cladding 1b, and has a 125 $\mu$m diameter $d_1$ to allow propagation of a 1.5 $\mu$m band signal light. Signal fiber 11, as an optical guide, is thinned as a portion 11a having 10 to 50 $\mu$m diameter $d_2$, typically 30 $\mu$m, for approximately 40 mm long by being heated and elongated. Next, glass soot doped with Er is coated on the thinned portion 11a, and is heated so as to melt and fuse thereon, so as to provide a glass member 12 doped with a rare earth (referred to hereinafter as a laser glass member 12). Diameter or thickness $d_3$ of laser glass member 12 is generally chosen equal to or larger than $d_1$ of signal fiber 11, that is, chosen 125 $\mu$m or larger, so that its mechanical strength is secured. Refractive index of the laser glass member 12 is approximately equal to that of cladding 1b of the signal fiber 11. Material of laser glass member 12 will be further described later in detail.

A pumping light $\lambda_2$ having wavelength 1.49 $\mu$m or 0.98 $\mu$m emitted from a laser light source formed of, for example, a popularly employed semiconductor laser is superposed onto a signal light $\lambda_1$ via a popularly employed multiplexer 14 which is formed of a half mirror selectively reflecting only the pumping light $\lambda_2$, so that the pumping light $\lambda_2$ propagates into thinned portion 11a. At thinned portion 11a, both the signal light $\lambda_1$ and pumping light $\lambda_2$ leak out into laser glass member 12 via outer surface of thinned portion 11a. This is because, as well known, the thinner the diameter becomes, the more extends the radial distribution of light power of a light propagating in an optical fiber as schematically illustrated in FIG. 4; accordingly, a part of the light power leaks out of the optical fiber. This also means that an external light can come into the thinned portion of the optical fiber via its outer surface; in other words, the outside and the inside of the optical fiber are optically coupled at the thinned portion of the optical fiber.

Laser glass member 12 is formed of quartz containing ten to several thousands ppm, preferably several hundred ppm, of Er (erbium) doped therein. As widely known, when both of an approximately 1.356 $\mu$m signal light $\lambda_1$ and an approximately 1.49 or 0.98 $\mu$m pumping light $\lambda_2$ are input into the laser glass the signal light is amplified. That is, when electrons in the Er doped in the laser glass is pumped by the 1.49 $\mu$m pumping light $\lambda_2$, there is caused a stimulated emission so as to emit an approximately 1.536 $\mu$m wavelength light. Consequently, the signal light $\lambda_1$ is amplified. Thus amplified signal light $\lambda_1$ in laser glass member 12 is returned via the thinned portion 11a back to signal fiber 11. Pumping light $\lambda_2'$ unnecessary now in signal fiber 11 is removed therefrom by a demulitiplexer 15, which is widely employed and formed typically in the same way as multiplexer 13. Thus, only the amplified light signal $\lambda_1'$ is transmitted out into signal fiber 11'.

Figure 2A:
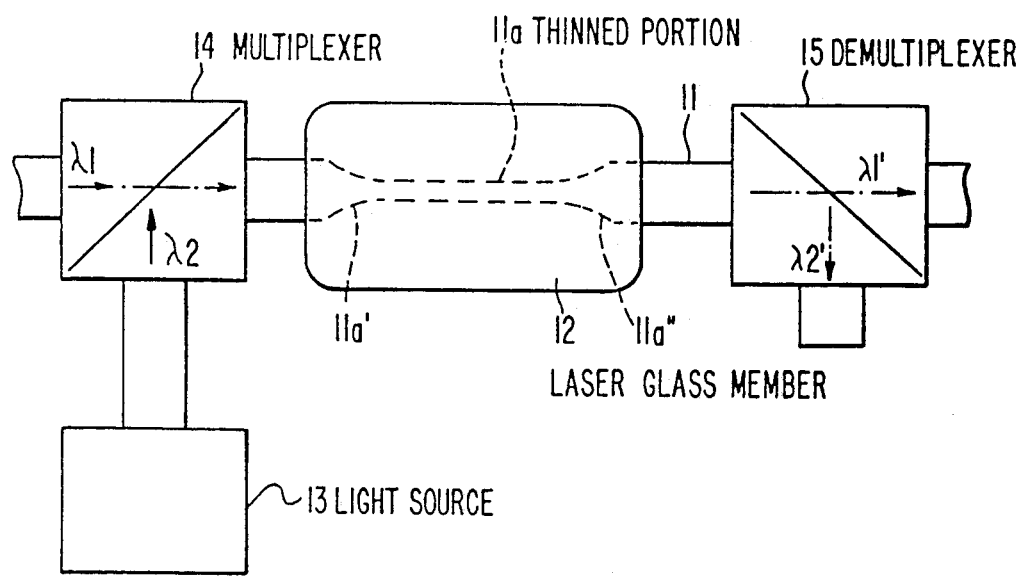
FIG. 2(a) schematically illustrates a first preferred embodiment of the present invention.
Figure 2B:
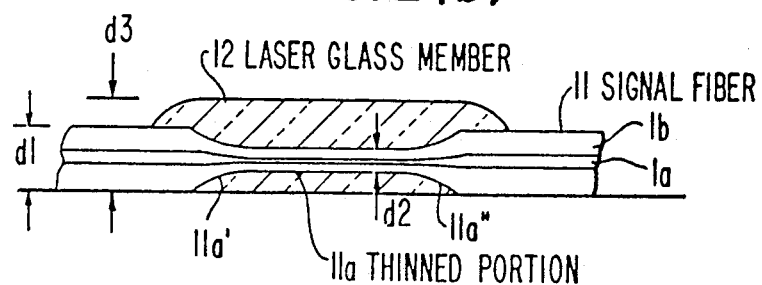
FIG. 2(b) shows a cross-sectional side view cut orthogonally to an axis of an amplifier portion of the FIG. 2(a) first preferred embodiment.

In order to achieve an adequate light amplification, it is preferable that slope 11a' of the transition from diameter $d_1$ of signal fiber 1 to diameter $d_2$ of thinned portion 11a is symmetric to slope 11a'' of the transition from diameter $d_2$ of thinned portion 11a to diameter $d_1$ of signal fiber 11, i.e. two slopes 11a' and 11a'' in FIG. 2(a) are symmetric with respect to the mid point of thinned portion 11a.

Laser glass member 12, which can be as short as several centi-meters as described above compared with the FIG. 1 prior art amplifier requiring as long as several meters to more than one hundred meter long rare-earth-doped glass fiber, allows to achieve a compact optical amplifier.

Though the FIG. 2(a) preferred embodiment shows a forward pumping where the pumping light propagates in the same direction as the signal light, it is apparent that the present invention can be embodied in a backward pumping where the pumping light is input via demultiplexer 15, which is used as a multiplexer, so as to propagate into thinned portion 11a in the opposite direction to the signal light.

FIG. 3 shows a second preferred embodiment of the present invention. Thinned portion 21a of signal fiber 21 and laser glass member 22 are constituted with substantially identical material and in substantially same size to those of the first preferred embodiment, except that laser glass member 22 comprises a flat surface 22a in addition to curved surface 22b as shown in FIG. 3(b), which is a cross-sectional view cut orthogonally to the axis. Flat surface 22b contacts a surface of a supporting substrate 25. Shape of the cross-sectional views is preferably chosen semicircular, parabolic, elliptic or others. Laser glass member 22 is produced in such way that soot of the laser glass material is coated around outside of thinned portion 21a, and thus coated glass fiber is heated to melt in the same way as that of the first preferred embodiment; next, the fiber glass having the melt glass therearound is put into a mold, and is cooled therein; next, the cooled glass is taken out of the mold. Thus, the glass is formed according to the shape of the mold. Supporting substrate 25 is provided with a light source 23 of a pumping light $\lambda_2$ having 1.49 $\mu$m or 1.98 $\mu$m wavelength formed of typically a popularly employed semiconductor laser, etc., so that the pumping light $\lambda_2$ is injected directly into laser glass member 22 via a lens 24 or a transparent plate. Lens 24 focuses and longitudinally distributes the pumping light along the vicinity of the thinned portion 21a. when the input signal light $\lambda_1$ is propagating in thinned portion 21a, the signal light leaks out to laser glass member 22 in the same was as the first preferred embodiment. Thus leaked out signal light in laser glass member 22 is amplified by the pumping light in the same principle as the first preferred embodiment. Thus amplified signal light is optically coupled back to thinned portion 22a so as to be transmitted, as indicated $\lambda_2'$, into signal fiber 21. In this preferred embodiment, too, in order to remove the unnecessary pumping light, a demultiplexer may or may not be provided at the output of the amplifier in the same way as the first preferred embodiment. In the second preferred embodiment, approximately 1 db amplification gain was achieved. Moreover, the second preferred embodiment having the light source 23 installed in the substrate 25 as well as being able to omit the multiplexer allows to achieve a compact light amplifier constitution and allows deletion of troublesome alignment work of the multiplexer. Accordingly, the production cost can be low, the production process can be simple as well as the reliability of the operation can be enhanced.

Though in the above second preferred embodiment light source 23 is installed in supporting substrate 25, the light source may be located over or on the side of laser glass member 22.

As a third preferred embodiment of the invention, the FIG. 2(a) preferred embodiment can be added with light isolators 16-1 and 16-2, respectively between multiplexer 14 and thinned portion 11a, and between thinned portion 11a and demultiplexer 15, as shown in FIG. 6. In FIG. 6, the arrows in the multiplexer and demultiplexer indicate the direction along which the signal light, the pumping light and any other stimulated emission light (i.e. a noise light) can propagate. Isolators 16-1 and 16-2 prevent the lights sent out into signal fiber 11 from returning back into glass member 12. The isolators contribute to an increase in the light amplification gain by several decibels.

FIG. 7(a) shows a plan view of a fourth preferred embodiment of the present invention, where the optical transmission line is formed of an optical thin base material waveguides 52. FIG. 7(b) shows a side view looking at input/output side of the FIG. 7(a) preferred embodiment. FIG. 8 schematically illustrates a cross-sectional view cut along ling A—A' of FIG. 7(a). In a substrate 51 formed of quartz glass, there is formed an optical waveguide 52 having a refraction index higher than that of substrate 51, according to a widely employed technique. A signal light $\lambda_1$ and a pumping light $\lambda_2$ carried by an optical fiber transmission line 53 are input into an end of optical wave guide 52-1. Optical waveguide 52 is narrowed for a predetermined length so as to form a narrowed portion 54 while the thickness is kept same. In to the vicinity of narrowed portion 54, a dopant, such as Er, is diffused so as to form a laser glass portion 55.

Signal light $\lambda_1$ and pumping light $\lambda_2$ go to and come from laser glass portion 55 via the sides of narrowed portion 54. Signal light $\lambda_1'$ amplified in laser glass portion 55 in the same way as the previous preferred embodiments is output via optical waveguide 52-2 to an optical fiber transmission line (not shown in the figure).

FIG. 9 schematically illustrates a plan view of a fifth preferred embodiment of the present invention, where are additionally provided a multiplexer 58 and demultiplexer 59, each formed of an optical thin base material waveguide in the same way as transmission line 52, according to a widely known technique. A pumping light $\lambda_2$ is input to an optical thin base material waveguide 56, and unnecessary pumping light $\lambda_2'$ is removed to an optical thin film waveguide 57.

FIGS. 10 schematically illustrate cross-sectional views cut along the thinned portion 54 of optical waveguide of sixth preferred embodiments of the present invention. Optical waveguide 52' is thinned for a predetermined length so as to form a thinned portion 60 or 60'. Laser glass member 61 or 61' is covering over thinned portion 60 or 60', respectively. Surface of thinned portion 60 is coplanar with surfaces of optical waveguides 52', while bottom of thinned portion is not coplanar with bottoms of optical waveguides 52', as shown in FIG. 10(a). Bottom of thinned portion 60' is coplanar with bottoms of optical waveguides 52", while the surface of thinned portion 60" is not coplanar with bottoms of optical waveguides 52", as shown in FIG. 10(b).

Though an optical waveguide formed in a substrate has been referred to in the fourth to sixth preferred embodiments, it is apparent that the optical waveguide may be replaced with a ridge-type optical thin base material waveguide formed over a glass substrate.

Though in the above preferred embodiments it is explained that the diameter of the optical fiber at the normal diameter portion 11 and 21 is 125 $\mu$m; the amplifier portion 11a and 21a is typically 30 $\mu$m (10 to 50 $\mu$m); wavelength of the pumping light is 1.49 or 0.98 $\mu$m; and the laser glass is doped with Er, these are preferable conditions for amplifying 1.536 $\mu$m signal light. For other-wavelength light amplifier, the dimensions may be different, and a different rare-earth material, such as neodymium (Nd); yttrium (Yb); samarium (Sm) or praseodymium (Pr) may be doped approximately several tens to several tens thousands ppm, preferably 100 to 200 ppm, and a pumping light having a wavelength appropriate for the employed dopant may be employed. Moreover, aluminum may be additionally doped thereto as well known in order to enhance the activity of the rare earth dopant so as to expand the gain bandwidth of the amplification. Amount of the aluminum addition is preferably several hundreds to several tens of thousands ppm.

Though in the above-described preferred embodiments, the thinned portion 11a or 12a was referred to as the present invention 40 mm long, the length may be arbitrarily changed according to the requirement. Moreover, the light source 44 in the second preferred embodiment may be provided in a plural quantity along the thinned portion 12a according to the requirement.

The many features and advantages of the invention are apparent from the detailed specification and thus, it is intended by the appended claims to cover all such features and advantages of the system which fall within the true spirit and scope of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention.

What we claim is:

1. An optical waveguide amplifier for amplifying an optical signal propagating therein, comprising:
   a laser glass member, doped with a rare earth element, and
   optical waveguide means, including:
      input end means for receiving the optical signal from a light source, and
      amplifying means, formed substantially thinner than the input end means, for contacting the laser glass member and for amplifying the optical signal.

2. An optical amplifier as recited in claim 1, wherein the optical waveguide is an optical fiber.

3. An optical amplifier as recited in claim 1, wherein a second cross section of the amplifying means is approximately 8 to 40% of a first cross section of the input end means.

4. An optical amplifier as recited in claim 2, wherein said second cross section of the amplifying means has approximately 10 to 50 $\mu$m diameter for amplifying an approximately 1.536 $\mu$m wavelength light.

5. An optical amplifier as recited in claim 1, wherein the optical transmission line is an optical thin base material waveguide formed in a glass substrate, said optical thin base material waveguide having a width and a thickness.

6. An optical amplifier as recited in claim 5, wherein said second cross section is thinner than said first cross section while same in width.

7. An optical amplifier as recited in claim 5, wherein said second cross section is wider than said first cross section while same in thickness.

8. An optical amplifier as recited in claim 5, wherein said glass member is formed in an adjacent portion of said glass substrate.

9. An optical amplifier as recited in claim 1, wherein the optical waveguide is a ridge-type optical thin base material waveguide formed on a glass substrate, said optical thin base material waveguide having a width and a thickness.

10. An optical amplifier as recited in claim 9, wherein said glass member is formed over and on sides of said ridge.

11. An optical amplifier as recited in claim 1, wherein a slope of transition from said first cross section to said second cross section is symmetrical to a slope of transition from said second cross section to said first cross section with respect to a midpoint of said thinned portion.

12. An optical amplifier as recited in claim 1, wherein said laser glass member is doped with a dopant selected from a group of erbium; neodymium; ytterbium; samarium and praseodymium, wherein an amount of said dopant is approximately ten ppm to several thousands ppm.

13. An optical amplifier as recited in claim 1, wherein said laser glass member is doped with a dopant selected from a group of erbium; neodymium; ytterbium; samarium and praseodymium, and aluminum in addition thereto, wherein an amount of said aluminum is several hundreds ppm to several tens of thousands ppm.

14. An optical amplifier, for amplifying a signal light propagating in an optical waveguide having a first cross section, comprising:
- a thinned portion of said optical waveguide, said thinned portion having a second cross section substantially smaller than said first cross section;
- a glass member formed of a laser glass material doped with a rare earth element, said glass member contacting said thinned portion; and
- a multiplexer provided on said optical waveguide, for introducing a pumping light into said optical waveguide so as to propagate into said thinned portion, whereby said light output from said thinned portion has been amplified.

15. An optical amplifier as recited in claim 14, wherein said multiplexer is located at an input side of the signal light to said thinned portion.

16. An optical amplifier as recited in claim 14, wherein said multiplexer is located at an output side of the signal light from said thinned portion.

17. An optical amplifier as recited in claim 14, further comprising a demultiplexer provided on said optical waveguide, wherein said pumping light propagating from said thinned portion is removed from said optical waveguide.

18. An optical amplifier as recited in claim 17, wherein said demultiplexer is located opposite from said multiplexer with respect to said thinned portion.

19. An optical amplifier as recited in claim 17, wherein said optical waveguide; said thinned portion; said multiplexer; and said demultiplexer are formed in or on a glass substrate.

20. An optical amplifier, for amplifying a light propagating in an optical waveguide having a first cross section, comprising:
- a thinned portion of said optical waveguide, said thinned portion having a second cross section substantially smaller than said first cross section;
- a glass member formed of a laser glass material, said glass member contacting said thinned portion; and
- a light source for emitting a pumping light to be introduced into said glass member via a surface of said glass member,
- whereby said light output from said thinned portion has been amplified.

21. An optical amplifier as recited in claim 20, wherein said glass member has a curved surface and a flat surface for receiving said pumping light.

22. An optical amplifier as recited in claim 20, wherein said curved surface reflects said received pumping light to a vicinity of said thinned portion.

23. An optical amplifier as recited in claim 20 further comprising a substrate on which said thinned portion and said light source are installed, said pumping light being introduced via a hole provided on said substrate to said glass member.

24. An optical amplifier as recited in claim 20 further comprising a lens or a transparent plate, between said glass member and said light source.

* * * * *